Patented Dec. 22, 1953

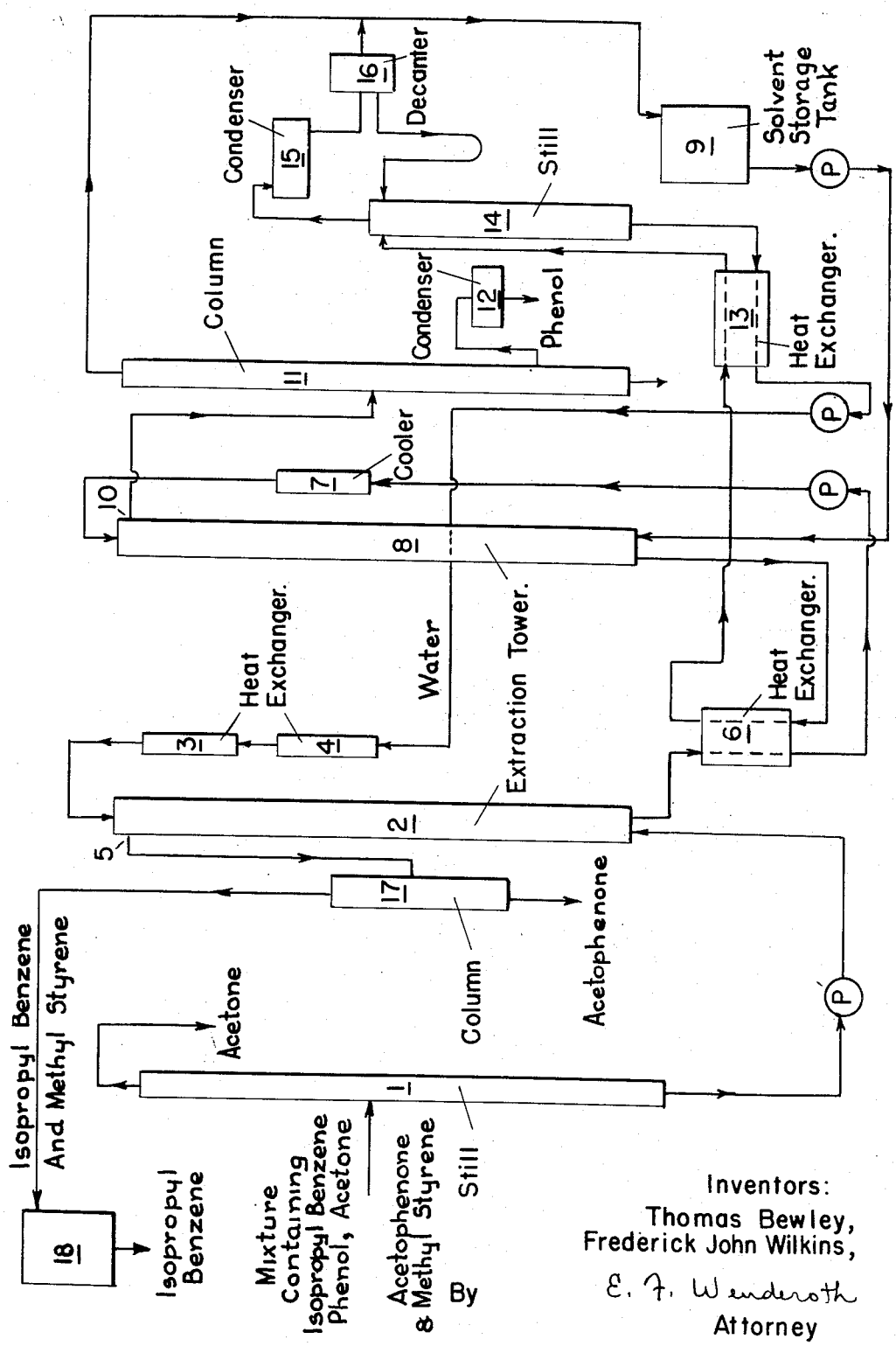

2,663,743

UNITED STATES PATENT OFFICE 2,663,743

MANUFACTURE OF PHENOL

Thomas Bewley, Epsom, and Frederick John Wilkins, Epsom Downs, England, assignors to Hercules Powder Company, a corporation of Delaware Application April 8, 1949, Serial No. 86,258

Claims priority, application Great Britain April 20, 1948

12 Claims. (Cl. 260—621)

This invention relates to an improved process for the manufacture of phenol and refers in particular to the step of its recovery from its solution in isopropyl benzene. Such mixtures are obtained for instance when isopropyl benzene hydroperoxide dissolved in isopropyl benzene is treated with acid such as sulphuric acid, in order to produce phenol and acetone by the decomposition of said isopropyl benzene hydroperoxide. This peroxide in its turn may be produced by the oxidation of isopropyl benzene in the liquid phase by means of molecular oxygen at elevated temperatures. Processes of this nature have been described in co-pending U. S. A. patent applications Serial No. 5,178, filed January 21, 1948, now U. S. Patent No. 2,628,983, Serial No. 15,954, filed March 19, 1948, now U. S. Patent No. 2,632,772, and Serial No. 45,326, filed August 20, 1948.

It has been found that besides phenol and acetone as main products the reaction mixture resulting from the decomposition step contains also small amounts of acetophenone and methyl styrene. These substances cause difficulties in the separation and the isolation of the phenol and in the reuse of the unreacted isopropyl benzene for the same process of oxidising it to its peroxide.

In spite of the considerable differences in their boiling points—isopropyl benzene boils at 152° C. and phenol at 182° C.—a complete separation by distillation is difficult and requires the use of high reflux ratios necessitating thereby the consumption of large quantities of steam, large distillation columns, condensers and the like. Moreover, practically complete separation of the phenol from the acetophenone also present and the recovery of the whole of the phenol in a substantially pure state by distillation is not possible since these two substances form a constant boiling mixture. The presence of acetophenone in the phenol even in small amounts detracts considerably from the value of the latter substance.

The re-use of the unchanged isopropyl benzene on the other hand, is important for the economic success of the process of manufacturing phenol and acetone by the said method, especially as, on account of the incipient decomposition of the peroxidic compounds already formed when a certain limit of their concentration in the liquid mixture is exceeded, it has been found expedient to terminate the oxidation when about 20 to 25 percent of the isopropyl benzene has been converted into the corresponding peroxide. On subjecting this mixture to a heat treatment with acid in order to decompose the peroxide contained therein and form phenol the admixed 80 to 75 percent of isopropyl benzene which remained unreacted upon by the oxygen have to be recycled to the oxidation stage after the phenol has been recovered therefrom. Any phenol left in the isopropyl benzene not only reduces the yield of the valuable product as it is destroyed in the course of the subsequent oxidation step to which the isopropyl benzene is recycled, but also impairs the efficiency of the oxidation process itself.

It is an object of the present invention to provide a simple process by which the phenol is obtained substantially uncontaminated by acetophenone, and by which the phenol is recovered as completely as possible. It is a further object of the invention to recover the unreacted isopropyl benzene substantially free from phenol, so that after removal of the acetophenone and methyl styrene admixed therewith the isopropyl benzene may be recycled for further oxidation to its peroxide.

Accordingly the invention provides in the manufacture of phenol by the oxidation of isopropyl benzene into isopropyl benzene hydroperoxide and the decomposition of said hydroperoxide in its solution in unchanged isopropyl benzene into a mixture containing phenol, acetone, acetophenone and methyl styrene, the step of recovering the phenol substantially free from acetophenone which comprises extracting said mixture with water at temperatures between 50° C. and 100° C. and recovering the phenol from the aqueous extract.

The extraction with water according to this invention is carried out preferably after the acetone has been removed from the reaction mixture for instance by distillation. The preferred temperature of the water for the extraction is between 70° and 80° C. The water dissolves practically all the phenol which can be recovered therefrom by any suitable method, for instance by extraction with a preferential solvent for phenol, such as butyl acetate or di-isopropyl ether.

The extraction by means of water is advantageously carried out by contacting the mixture resulting from the decomposition of isopropyl benzene hydroperoxide preferably after the removal of the acetone with a countercurrent stream of water for instance in a packed tower or by any other of the well-known methods of countercurrent extraction.

The acetophenone on the other hand remains to a large extent dissolved in the isopropyl benzene and only very minor proportions thereof go into the aqueous phase containing essentially all the phenol. In this way a substantial separation of the acetophenone from the phenol is achieved.

The isopropyl benzene phase containing methyl styrene in addition to the acetophenone as impurities can easily be purified from these substances. It can be freed from the acetophenone for instance, by distillation and from the methyl styrene for instance, by converting the latter by hydrogenation into isopropyl benzene. After such purification the isopropyl benzene is sufficiently pure to be subjected to the oxidation process in order to produce therefrom its hydroperoxide which may then be decomposed for the manufacture of phenol. It is therefore an additional feature of the present invention to recycle the isopropyl benzene after the purification to the oxidation stage.

Any small quantity of phenol which may be left behind in the isopropyl benzene after the extraction with hot water may if so desired be removed by an additional extraction with aqueous alkali metal hydroxide solution. In most cases however the amount of phenol left behind in the isopropyl benzene is so small that it will not cause any material disadvantage in a technical or economic respect.

The attached diagram and the example illustrate the method by which the process of the invention may be carried out in practice, the percentages given being by weight.

The reaction mixture coming from the reactor in which the decomposition of the isopropyl benzene peroxide in isopropyl benzene by means of for instance, sulphuric acid has been effected is freed from any acid admixed therewith by washing with small quantities of water. It contains isopropyl benzene, phenol, acetone, acetophenone and methyl styrene. This mixture is then pumped to a distillation column 1, operated at atmospheric pressure. From the top of this column acetone is distilled off and flows to storage. From the base of the column 1 acetone-free material, in the form of an oily liquid, is pumped at a temperature of about 150° C. to the base of a packed tower 2 and flows upwards through the tower in countercurrent to a descending stream of hot water pumped to the top. The temperature of this water is adjusted by heat exchangers 3 and 4 to maintain the temperature of approximately 70° to 80° C. in the tower 2. In this tower the bulk of the phenol with very little of the acetophenone passes into the aqueous phase while the oil phase containing mainly isopropyl benzene substantially free from phenol but still containing the bulk of the acetophenone overflows from the top of the tower 2 at 5. This oil phase is then subjected to distillation in column 17 to remove the acetophenone. After treatment for removal of methyl styrene by hydrogenation in reactor 18 the isopropyl benzene may then be recycled to the oxidation reactor.

The aqueous solution of phenol containing a little acetophenone flows from the base of the extraction tower 2 through a heat exchanger 6 in which it is cooled to about 30° C. and is then pumped through further cooler 7 to the top of a second packed tower 8 which it enters at about 20° C. In this tower it is contacted with a countercurrent stream of butyl acetate or other suitable solvent pumped from a storage tank 9 into the base of the tower. The butyl acetate extracts substantially all the phenol and the small quantity of acetophenone from the aqueous solution to give a concentrated extract which overflows from the top of the tower 8 at 10 to the distillation column 11, and from the top of this column the butyl acetate is distilled off and flows to tank 9. Phenol, substantially free from acetophenone, is taken off as a vapour from an intermediate point in the column 11 to a condenser 12 from which it flows to storage. The residue which flows to waste from the base of column 11 consists of the small amount of acteophenone present in the butyl acetate extract together with a very small quantity of phenol.

Alternatively the whole of the phenol, together with its small admixture of acetophenone can be taken off as a residue from the base of column 11 and passed to a further column in which the phenol is taken off as a distillate and the small amount of acetophenone together with a little phenol is discharged as a residue.

The water leaving the base of the second extraction tower 8 is saturated with butyl acetate. It flows through heat exchanger 6 in which its temperature is raised to about 60° C. and then through a second heat exchanger 13 in which its temperature is further raised to about 90° C. and thence to a distillation column 14. From this column the butyl acetate is distilled off as its constant boiling mixture with water and flows to a condenser 15 and decanter 16 from which the water is taken back to the top of distillation column 14 and the butyl acetate flows to tank 9. The stripped water from the base of said column 14 passes through heat exchanger 13 where it is cooled to about 70° C. and is then pumped to the top of the first extraction tower 2. Its temperature is adjusted to maintain the required temperature of 70° to 80° C. in the tower 2 by passage through heat exchangers 3 and 4 in which it can be either heated by steam or cooled by cold water.

*Example*

71.6 lbs./hr. of a mixture resulting from the oxidation of isopropyl benzene and decomposition of the peroxide with aqueous sulphuric acid, and containing 9.1% of acetone, 15.2% phenol, 0.84% acetophenone, 1.5% methyl styrene and the remainder isopropyl benzene, was fed to a distillation column to separate the acetone. The resulting acetone-free liquid, 65.1 lbs./hr., contained 16.7% phenol, 0.92% acetophenone, 1.7% methyl styrene and the remainder isopropyl benzene. It was fed to the base of a packed column which was maintained at a temperature of approximately 70–80° C. and to the top of which was admitted 417 lbs./hr. of water at about 70° C.

Approximately 98% of the phenol and only 25% of the acetophenone was extracted from the isopropyl benzene to give 427.8 lbs./hr. of an aqueous solution containing 2.5% phenol and 0.035% acetophenone. The extracted isopropyl benzene, after distillation to separate acetophenone, and treatment to remove methyl styrene, was recycled to the oxidation stage of the process.

The aqueous extract was cooled to 20° C. and admitted to the top of a second packed column. Into the base of this column was fed 18 lbs./hr. of butyl acetate. Approximately 99% of the phenol was extracted from the aqueous solution to give 26.6 lbs./hr. of an extract containing 40% of phenol and substantially all of the acetophenone from the aqueous solution. The extracted aqueous solution from the base of the column contained approximately 0.5% butyl acetate and after distillation to recover this butyl acetate was used again for extraction in the first tower.

The butyl acetate extract containing 40% of phenol was distilled to recover 15.9 lbs./hr. of butyl acetate which was used again in the extraction process. The residual 10.6 lbs./hr. of phenol plus 0.15 lb./hr. of acetophenone was distilled to give a distillate of 10.55 lbs./hr. of phenol substantially free from acetophenone and a residue of 0.15 lb./hr. acetophenone plus 0.05 lb./hr. of phenol.

We claim:
1. In the maufacture of phenol by the oxidation of isopropyl benzene into isopropyl benzene hydroperoxide and the decomposition of said hydroperoxide in its solution in unchanged isopropyl benzene to form phenol, said solution also containing acetophenone, acetone and methyl styrene, the step of substantially separating the phenol from said acetophenone, acetone and methyl styrene which comprises extracting the reaction mixture with water at temperatures between 50° and 100° C. and recovering the phenol from the aqueous extract.

2. Process according to claim 1, wherein the temperature is between 70° and 80° C.

3. Process according to claim 1, wherein the water extraction is effected after removal of the acetone.

4. Process according to claim 3, wherein the acetone is removed by distillation.

5. In the manufacture of phenol by the oxidation of isopropyl benzene into isopropyl benzene hydroperoxide and the decomposition of said hydroperoxide in its solution in unchanged isopropyl benzene to form phenol, the step of recovering the phenol from said solution containing in addition acetone and methyl styrene which comprises extracting the reaction mixture with water at temperatures between 50° and 100° C. and recovering the phenol from the aqueous extract by contact with an organic solvent which is substantially immiscible with water and a solvent for phenol, and subsequent distillation.

6. Process according to claim 5, wherein after the extraction with water any residual phenol is removed from the unchanged isopropyl benzene by washing with aqueous alkali metal hydroxide solution.

7. Process according to claim 6, wherein the unchanged isopropyl benzene after the substantially complete removal of phenol therefrom is substantially freed from acetophenone and methyl styrene before it is recycled to the oxidation stage.

8. In the manufacture of phenol by the oxidation of isopropyl benzene into isopropyl benzene hydroperoxide and the decomposition of said hydroperoxide in its solution in unchanged isopropyl benzene to form a solution containing phenol, acetophenone, acetone and methyl styrene as well as unreacted isopropyl benzene, the process of recovering the latter substantially free from phenol, acetophenone, acetone and methyl styrene, whereby the thus-purified unreacted isopropyl benzene may be recycled for further oxidation into isopropyl benzene hydroperoxide without impairing the efficiency of the oxidation due to prejudicial impurities, said process comprising removing the acetone from said last-named solution by distillation, then extracting the acetone-free solution with water at 50 to 100° C. whereby the phenol is essentially entirely removed, removing the acetophenone from its solution in the isopropyl benzene by distillation, converting the methyl styrene in the isopropyl benzene into isopropyl benzene by hydrogenation, whereby the purified isopropyl benzene may be recycled for further oxidation into isopropyl benzene hydroperoxide, and recovering the phenol from the aqueous solution thereof.

9. In the manufacture of phenol by the oxidation of isopropyl benzene into isopropyl benzene hydroperoxide and the decomposition of said hydroperoxide in its solution in unchanged isopropyl benzene to form a solution containing phenol, acetophenone, acetone and methyl styrene as well as unreacted isopropyl benzene, the process of recovering the latter substantially free from phenol, acetophenone, acetone and methyl styrene, whereby the thus purified unreacted isopropyl benzene may be recycled for further oxidation into isopropyl benzene hydroperoxide without impairing the efficiency of the oxidation due to prejudicial impurities, said process comprising removing the acetone from said last-named solution by distillation, then extracting the acetone-free solution with water at 50 to 100° C. whereby the phenol is essentially entirely removed, removing the acetophenone and methyl styrene from the remaining isopropyl benzene solution, whereby the purified isopropyl benzene may be recycled for further oxidation into isopropyl benzene hydroperoxide, and recovering the phenol from the aqueous solution thereof.

10. In the manufacture of phenol by the oxidation of isopropyl benzene into isopropyl benzene hydroperoxide and the decomposition of said hydroperoxide in its solution in unchanged isopropyl benzene to form phenol, the step of recovering the phenol from said solution containing in addition acetone and methyl styrene which comprises extracting the reaction mixture with water at temperatures between 50° and 100° C. and recovering the phenol from the aqueous extract by contact with butyl acetate, and subsequent distillation.

11. In the manufacture of phenol by the oxidation of isopropyl benzene into isopropyl benzene hydroperoxide and the decomposition of said hydroperoxide in its solution in unchanged isopropyl benzene to form phenol, the step of recovering the phenol from said solution containing in addition acetone and methyl styrene which comprises extracting the reaction mixture with water at temperatures between 50° and 100° C. and recovering the phenol from the aqueous extract by contact with diisopropyl ether, and subsequent distillation.

12. In the manufacture of phenol by the oxidation of isopropyl benzene into isopropyl benzene hydroperoxide and the decomposition of said hydroperoxide in its solution in unchanged isopropyl benzene to form phenol, the step of recovering the phenol from said solution containing in addition acetone and methyl styrene which comprises extracting the reaction mixture with water at temperatures between 50° and 100° C. and recovering the phenol from the aqueous extract by contact with an organic solvent which is substantially immiscible with water and a solvent for phenol, distilling the resulting solvent solution containing phenol and a small quantity of acetophenone to remove the solvent as distillate and leaving as residue phenol with its small admixture of acetophenone, and distilling said residue to recover phenol as distillate.

THOMAS BEWLEY.
FREDERICK JOHN WILKINS.

References Cited in the file of this patent
UNITED STATES PATENTS

| Number | Name | Date |
| --- | --- | --- |
| 2,199,786 | Dierichs et al. | May 7, 1940 |
| 2,339,889 | Strickland | Jan. 25, 1944 |

OTHER REFERENCES

Hock et al.: Berichte, vol. 77, pages 257–62, 1944.